Figure 1:
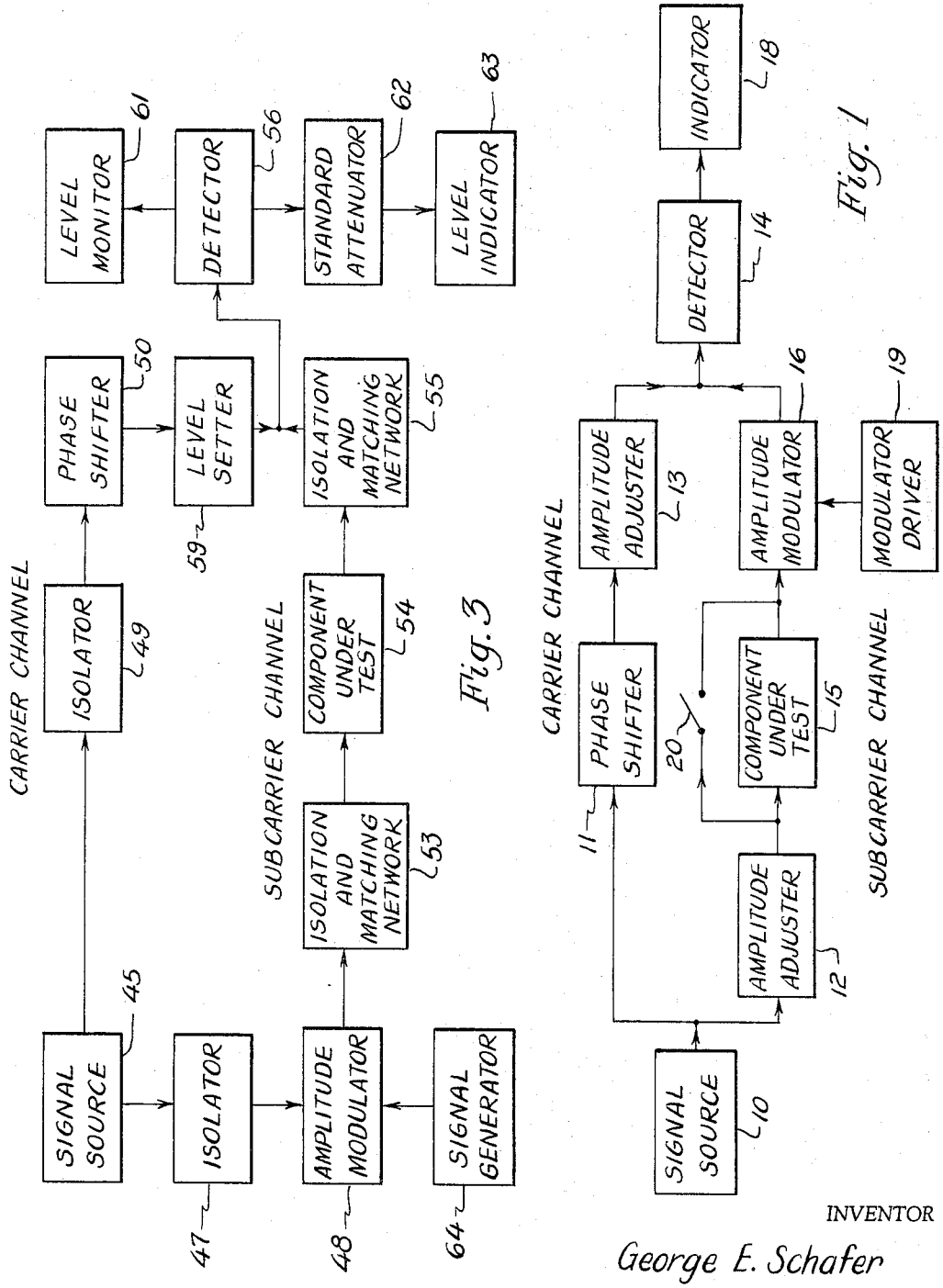

Oct. 25, 1966  G. E. SCHAFER  3,281,679
MODULATED SUBCARRIER SYSTEM FOR MEASURING
ATTENUATION AND PHASE SHIFT
Original Filed March 15, 1961  3 Sheets-Sheet 3

INVENTOR
George E. Schafer
BY David Robbins
John C. Stahl
ATTORNEYS

United States Patent Office 3,281,679
Patented Oct. 25, 1966

3,281,679
MODULATED SUBCARRIER SYSTEM FOR MEASURING ATTENUATION AND PHASE SHIFT
George E. Schafer, Boulder, Colo., assignor to the United States of America as represented by the Secretary of Commerce
Continuation of application Ser. No. 96,057, Mar. 15, 1961. This application May 11, 1965, Ser. No. 456,899
8 Claims. (Cl. 324—57)

This application is a continuation of U.S. Patent application No. 96,057, filed on March 15, 1961, now abandoned, by George E. Schafer.

This invention relates to a system for measuring microwave attenuation and/or phase shift of a test component and in particular to one employing modulated subcarrier techniques.

At present, microwave attenuation of a component is most commonly measured by one of the substitution systems. In these systems, a signal source, the component, a variable-standard attenuator and a suitable detector are all connected in series. In IF substitution, for example, an RF source is applied to the component under test and the signal is converted immediately thereafter to an IF signal. The standard attenuator is inserted in an IF channel connected to a second detector, the output of which is fed through an amplifier to an indicator. In AF substitution, an audio source modulates an RF source which applies a signal through the component under test to a detector. The output of the detector is applied through a standard attenuator and an amplifier to an indicator. In operation, the power level at the detector is adjusted in either system to some convenient reference level by the variable-standard attenuator and this initial reading is noted. The component under test is then removed and the detected output restored to the original level by adjusting the standard attenuator. The difference in the two readings indicates the attenuation of a signal passing through the component.

One advantage of the IF substitution is the wide dynamic range over which accurate measurements can be made because the converter (usually a crystal diode) is linear while one advantage of AF substitution is the need for only one signal source. A single sideband IF substitution system can, in principle, combine these two advantages. However, there are practical difficulties in reducing the unwanted sideband and carrier energy to a satisfactory low level.

In a conventional two-channel system for comparing the change of phase shift of a waveguide component with that of a standard phase shifter, the power from a source is divided into two signals. After each signal flows through an associated channel, the signals are recombined and fed to a null detector. Such a system has true null when the amplitudes of the two signals are equal. However, if the amplitude of one of the waves changes during the measurement, only a minimum occurs which becomes broader as the difference between wave amplitudes becomes greater. This has the disadvantage that in measuring phase shift changes of a variable attenuator, the amplitude of the wave emerging from the attenuator can change by 50 db or more. Considerable loss in precision is experienced when the amplitude of one of the waves differs from the other by more than 10 db. To a lesser extent, the small amplitude variations of a standard phase shifter affect the depth of the minimum. An attenuator with constant phase shift would be required to restore the initial null. If the phase shift of the attenuator used to restore the null changes with attenuation setting, some loss of accuracy occurs while the precision of a null response is restored.

Accordingly, it is an object of the present invention to provide a system that combines the advantages of the IF and AF substitution without requiring the suppression of either the carrier or one of the sidebands.

Another object is to provide a system capable of simultaneously measuring the phase shift and attenuation of a signal passing through the component under test.

Another object is to provide a two-channel system for comparing the change of phase shift of a waveguide component with that of a standard phase shifter which produces a null response for all ratios of the amplitude of the waves traversing the two channels.

Another object is to provide a two-channel system for comparing the change of phase shift of a waveguide component to that of a standard phase shifter in which the null obtained is insensitive to variations in amplitude caused by adjusting the standard phase shifter.

These and other objects are accomplished by applying a signal in parallel to a carrier channel including a phase adjuster and a subcarrier channel including a modulator and the component under test. The output of each channel is applied to the same detector to provide a signal at the modulation frequency having a magnitude proportional to the energy in the subcarrier channel. By incorporating proper measuring circuits, it is possible to measure simultaneously the phase shift and attenuation or merely the phase shift of a signal passing through the test component. In one embodiment, for example, for measuring phase shift and attenuation simultaneously the output of the detector is applied to a null detector and the output of a signal generator, that controls the modulator, is applied through a phase adjuster, an amplitude adjuster and a standard attenuator to the detector. The operation of this embodiment is indicated below in connection with FIG. 2.

Figure 2:
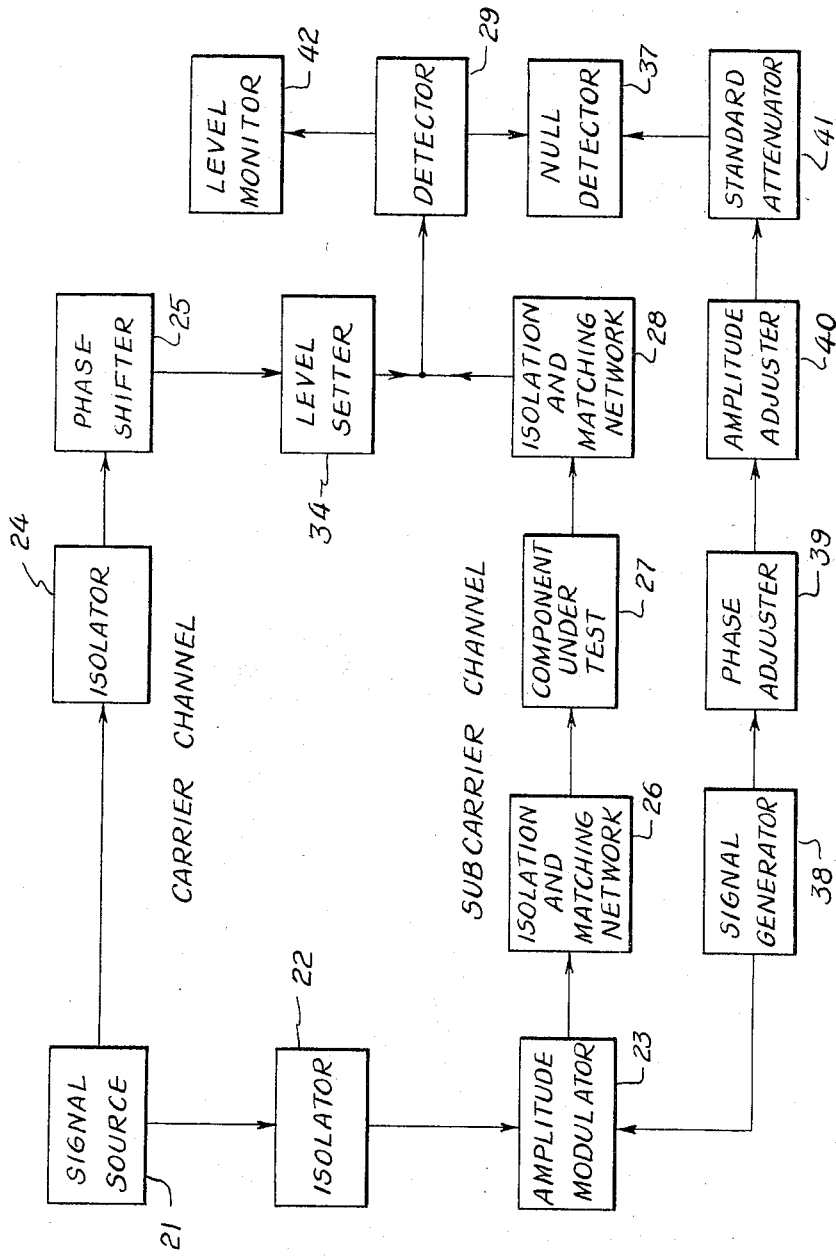
Figure 4:
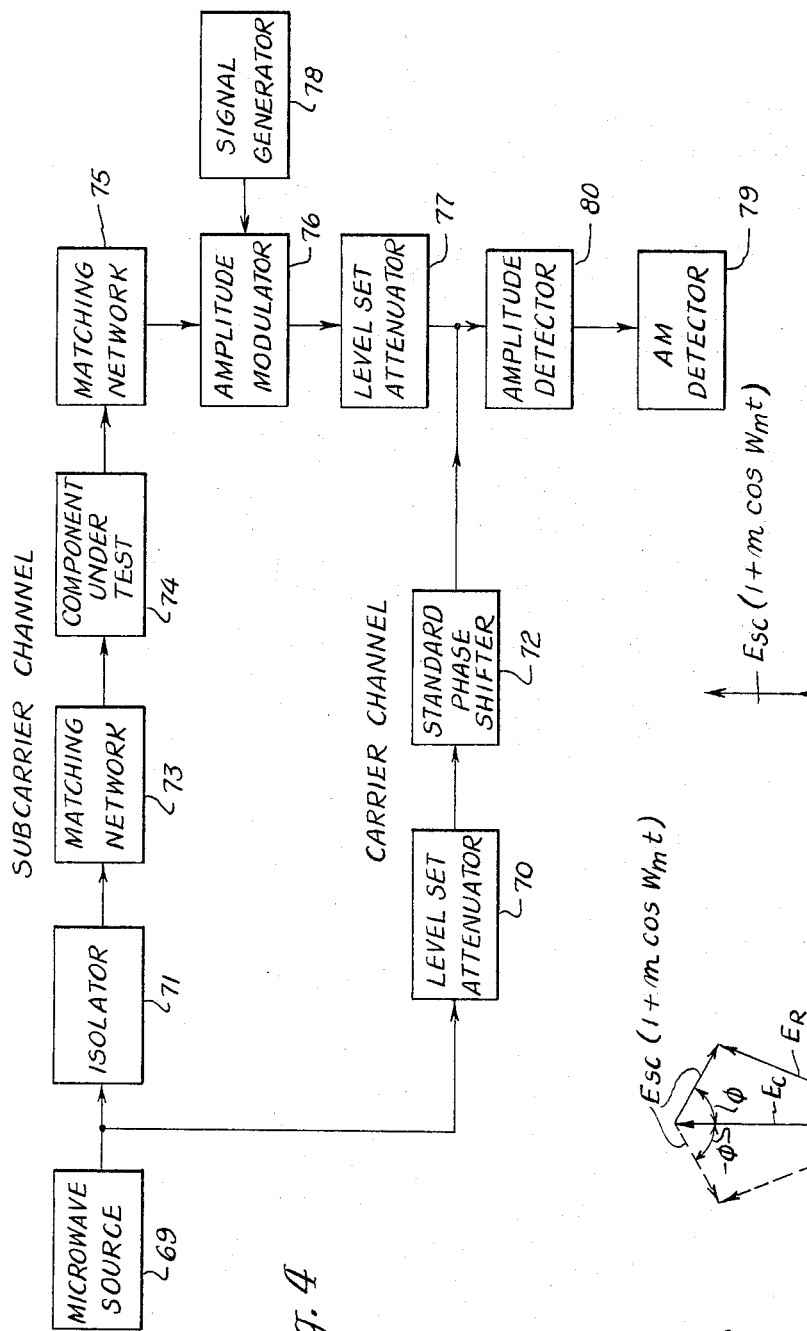
Figure 5:
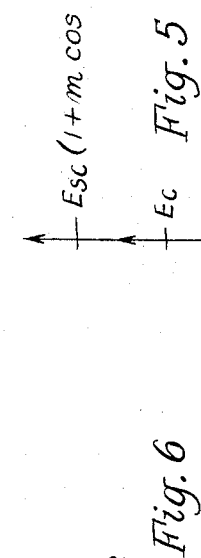
Figure 6:
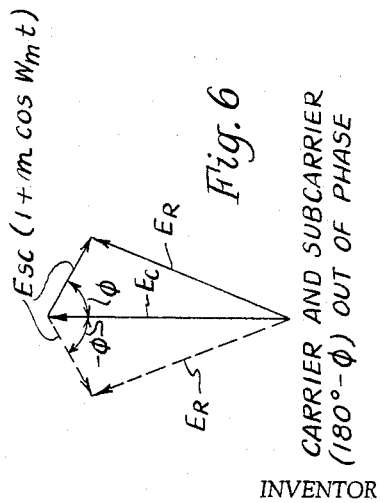

In the figures:
FIG. 1 is a first embodiment;
FIG. 2 is a second embodiment;
FIG. 3 is a third embodiment;
FIG. 4 is a fourth embodiment of the present invention; and
FIGS. 5 and 6 are vector diagrams used in explaining the operation of the fourth embodiment.

Referring to FIG. 1, the output of signal source 10, which may provide a microwave signal, is applied in parallel to phase shifter 11 in the carrier channel and amplitude adjuster 12 in the subcarrier channel. The output of phase adjuster 11 is applied through amplitude adjuster 13 to detector 14, a microwave amplitude detector, while the output of amplitude adjuster 12 is applied through the component under test 15, e.g., a microwave attenuator, and amplitude modulator 16 to the detector. Indicator 18 is connected to the output of detector 14. The output of modulator driver 19 is applied to the modulator, amplitude modulating the latter. Switch 20 is connected across component 15.

The waves traversing the channels labeled carrier and subcarrier channels in FIGS. 1 to 4 will hereinafter be referred to as carrier and subcarrier.

In analyzing the arrangement in FIG. 1, if the carrier and the amplitude modulated subcarrier are in phase, the combined signal delivered to detector 14 is amplitude modulated only. Therefore, the magnitude of the resulant output of the detector, $E_r$, is given by $$E_r = E_c + E_{sc}(1 + m \cos \omega_m t) \qquad (1)$$

where $E_c$ and $E_{sc}$ are the magnitudes of the carrier and subcarrier amplitudes, respectively, $m$ is the modulation factor or amplitude modulation percentage divided by 100 and $\omega_m$ is the angular frequency of the amplitude modulation. Equation 1 may be written in the form $$E_r = (E_c + E_{sc})\left(1 + \frac{mE_{sc}}{E_c + E_{sc}} \cos \omega_m t\right)$$

This is equivalent to a carrier, $E_c+E_{sc}$, with a modulation factor of $mE_{sc}/E_c+E_{sc}$. Therefore, if $E_c+E_{sc}$ and $m$ are kept constant, the output at the modulation frequency from linear detection of this combined signal will be proportional to $E_{sc}$. If detector 14 employs a crystal diode, the linearity of the detector over a large range of values of $E_{sc}$ is sufficient to accurately compare attenuation in the subcarrier channel with audio (or higher frequency) attenuation in a circuit attached to the output of detector 14. Examples of circuits effecting this comparison are shown in detail in FIGS. 2 and 3.

In operation, with switch 20 open, phase shifter 11 is adjusted so that the carrier and subcarrier are in phase. This could be accomplished, for example, by obtaining a maximum reading on indicator 18. Amplitude adjusters 12 and 13 are then set to provide some convenient reference level on indicator 18 and the reading is noted. Switch 20 is closed removing test component 15 from the carrier channel, phase shifter 11 is adjusted as above and the reading on the indicator is noted. The difference in the two readings of indicator 18 provides an indication of the attenuation of the subcarrier passing through component 15. The difference between the two settings of phase shifter 11 is a measure of phase shift in component 15 between its two settings.

Referring to FIG. 2, the output of signal source 21, which may be a microwave signal, is applied in parallel through isolator 22 to amplitude modulator 23 in the subcarrier channel and through isolator 24 to phase shifter 25 in the carrier channel. The output of modulator 23 is fed through isolation and matching network 26, the component under test 27, isolation and matching network 28 to detector 29 while the output of phase shifter 25 is applied through level setter 34 to the detector. Null detector 37 is connected to the output of detector 29. The output of signal generator 38 is applied to modulator 23, amplitude modulating the latter, and through phase adjuster 39, amplitude adjuster 40 and standard attenuator 41 to null detector 37. Finally, level monitor 42 is connected to detector 29.

In the operation, the component under test 27 is set to its "zero" or reference position and phase shifter 25 is adjusted so that the carrier and subcarrier are in phase. This could be accomplished, for example, by obtaining a maximum reading on level monitor 42. Standard attenuator 41 is then set to its "zero" or reference positions and phase adjuster 39 and amplitude adjuster 40 are set to produce a null indication on detector 37. The signals from detector 29 and attenuator 41 are then of equal amplitude. (It may be useful to note here that by temporarily adjusting the signal levels to be slightly different at null detector 37, greater precision is obtained in setting the phase of a carrier and subcarrier to be equal. This is desirable especially if variation of phase shift measurements are to be made simultaneously.) After a null is obtained with both component 27 and standard attenuator 41 at their reference positions, the former is set to the position where the attenuation value is to be measured. Standard attenuator 41 is adjusted to nearly produce a null in detector 37 and phase shifter 25 so that the carrier is again in phase with the subcarrier. Standard attenuator 41 is adjusted to produce a null at detector 37. The attenuator of the subcarrier passing through component 27 is then assumed to be equal to the attenuation introduced in attenuator 41. The difference between the two settings of phase shifter 25 is a measure of the variation of phase shift in the component under test between its two settings.

Referring to FIG. 3, the output of signal source 45, which may be a microwave signal, is fed through isolator 47 to amplitude modulator 48 in the subcarrier channel and through isolator 49 to phase shifter 50 in the carrier channel. The output of the modulator is connected through isolation and matching network 53, the component under test 54, and isolation and matching network 55 to detector 56 while the output of phase shifter 50 is connected through level setter 59 to the detector. The output of the detector is applied to level monitor 61 and is also applied through standard attenuator 62 to level indicator 63. Finally, signal generator 64 is connected to and controls modulator 48 to amplitude modulate the latter.

In operation, with the component under test 54 set at the position where the attenuation is to be measured and standard attenuator 62 set to its "zero" or reference position, the phase of the carrier and subcarrier are adjusted in the manner indicated above in connection with FIG. 2. After the gain level indicator 63 is adjusted to a convenient reference level, the component under test 54 is adjusted to its "zero" or reference position and the phase of the carrier is again adjusted by means of phase shifter 50 to be in phase with the subcarrier. Standard attenuator 62 is then adjusted to reproduce the reference level on indicator 63. The relative attenuation of the component under test 54 may be taken as equal to the relative attenuation of standard attenuator 62. The difference of the settings on phase shifter 50 may again be used as a measure of the variation of phase shift of the component 54 between its two settings.

Referring to FIG. 4, the output of microwave source 69 is applied in parallel to level set attenuator 70 in the carrier channel and isolator 71 in the subcarrier channel. The output of the attenuator is applied through standard phase shifter 72 to amplitude detector 80, which conveniently may be a crystal detector, while the output of the isolator is applied through matching network 73, component under test 74, matching network 75, amplitude modulator 76, and level set attenuator 77 to detector 80. The output of signal generator 78 modulates amplitude modulator 76 while the output of detector 80 is applied to the input of AM detector 79.

The principle used in the embodiment in FIG. 4 is based on the relationship between amplitude and phase modulation. As illustrated in FIG. 5, if a modulated signal, $E_{sc}(1+m \cos \omega_m t)$, is combined in phase with an unmodulated signal of the same frequency, $E_c$, then the resultant signal is just amplitude modulated at the same modulation frequency $\omega_m$. If, however, the phase of the modulated signal is 90° with respect to the resultant signal, $E_r$, (FIG. 6) it can be shown that the resultant $E_R$ is phase modulated at the modulation frequency and amplitude modulated at twice the modulation frequency. At other angles of combination, different amounts of amplitude modulation at $\omega_m$ and $2\omega_m$ and phase modulation at $\omega_m$ occur. Thus an AM detector 79, insensitive to phase modulation, tuned to $\omega_m$ will have a null response when the modulated signal is at a particular angle, $\phi$. The value of $\phi$ depends on the ratio $E_{sc}/E_c$, as will now be shown.

At amplitude detector 80, one may represent the voltages in a vector representation where the carrier is used as a phase reference for all other voltages presented, as was done in FIGS. 5 and 6. An expression may be written to obtain the resultant voltage, $E_r$, by the law of cosines, as $$E_r^2 = E_c^2 + E_{sc}^2(1+m \cos \omega_m t)^2 - 2E_c E_{sc}(1+m \cos \omega_m t) \cos \phi \quad (2)$$

from which we readily obtain:

$$E_r^2 = E_c^2 + E_{sc}^2 + \frac{m^2 E_{sc}^2}{2} - 2E_c E_s \cos \phi + (2mE_{sc}^2 - 2mE_c E_{sc} \cos \phi) \cos \omega_m t + \frac{m^2 E_{sc}^2}{2} \cos 2\omega_m t \quad (3)$$

The adjustment of the phase shifter for a null is equivalent to changing the angle $\phi$. In a tuned amplitude detector 79, the output will be proportional to the modulation component at the fundamental frequency $\omega_m$. The null response occurs when the amplitude of the fundamental modulation component of $E_R$ is zero, which from 3, is given by $$\cos \phi = \frac{E_{sc}}{E_c}$$

Table I shows the angles between $E_{sc}$ and $E_c$ at null response for various ratios of $E_c/E_{sc}$.

*Table I*

| $20 \log_{10}(E_c/E_{sc})$: | Angle $\phi$ at null response, degree |
|---|---|
| 0 | 0.00 |
| 10 | 71.56 |
| 20 | 84.26 |
| 30 | 88.19 |
| 40 | 89.43 |
| 50 | 89.82 |
| 60 | 89.94 |
| 70 | 89.98 |
| 80 | 89.99 |
| 90 | 90.00 |

In the limit as $E_{sc}$ reduces to zero the angle becomes exactly 90°. For ratios greater than 80 db the difference from 90° is less than 0.01°. The table may be used to estimate the number of degrees between the two null responses in the first procedure of the operation indicated below. It may also be used to estimate the limit of error occurring when the second procedure, indicated below, is used. It can be seen that the harmonics of $\omega$ which might be produced in the modulation process do not produce any error.

In operation, the wave passing through the subcarrier channel is amplitude modulated after passing through the component under test 74 and is then reduced in amplitude by level set attenuator 77 before being combined with the wave passing through the carrier channel which is set at a desired level as it passes through level set attenuator 70.

A description of two procedures for making phase shift measurement with this embodiment will be given to illustrate the operation of the system. In the first procedure to be described, a pair of measurements are made at both the initial and final settings of component under test 74. As will be seen, this corrects for changes in the magnitude of $\phi$ and reduces ambiguity in the relative phase of the subcarrier with respect to the carrier. In the second, a simplified procedure, only a single measurement is made at each setting of component under test 74. Precautions must be taken to ensure that the subcarrier leads or lags the carrier at both settings of the component under test since it is not known whether the subcarrier leads or lags the carrier, and therefore only the magnitude of the correction required for changes in amplitude are known. These magnitudes may be used as limits of error which are very small for certain measurements.

The first, an exact measuring procedure, is described in this paragraph. With the signal in the subcarrier channel turned off or highly attenuated, the carrier level is adjusted to deliver approximately 1 mw. of signal to amplitude detector 80. Signal generator 78 is adjusted to drive amplitude modulator 76 to produce at least 30% amplitude modulation at the center frequency of the AM detector 79. The component under test 74 is adjusted to its initial or "zero" setting and standard phase shifter 72 is adjusted to produce a null at AM detector 79. The phase of the subcarrier relative to the carrier is then $\pm(180-\phi)$ degrees. $\phi$ is always less than 90 degrees, and is given in Table I as a function of $E_{sc}/E_c$. To avoid the ambiguity of whether the carrier leads or lags the subcarrier and to avoid having to determine the magnitude of $\phi$ from measured ratios of the carrier and subcarrier, a second null response is obtained by adjusting standard phase shifter 72. The phase difference between carrier and subcarrier will now be of the opposite sign, as indicated by the dashed lines in FIG. 6. If the difference between the two readings of standard phase shifter 72 is less than 180° ($=2\phi$), then the average of these two readings correspond to a setting at which the subcarrier would be 180° out of phase with the carrier. The average of these two readings of the standard is termed the initial setting of the standard phase shifter 72. It is the reading which would produce a null if the carrier and subcarrier were of equal amplitude. If the difference between the two readings of the standard phase shifter is more than 180° (360°$-2\phi$), then the average corresponds to a setting at which the subcarrier and carrier are in phase. The component under test 74 is then set to its final setting. Standard phase shifter 72 is again adjusted to produce two separate nulls which must be selected so that at the final setting the carrier will be in phase or 180° out of phase with the subcarrier, whichever it was at the initial setting. The measured change of phase shift of the component under test 74 is then the difference between the final and initial settings of the standard phase shifter.

The second, a simplified procedure, is described in this paragraph. This procedure is similar to that described above except that only one null response is obtained at the initial and final settings of the component under test. Therefore, one must exercise care to make certain that the subcarrier either leads the carrier at both settings or lags the carrier at both settings. This is relatively easy for continuously variable microwave phase shifters by "tracking" the null.

The magnitude of the error in the phase shift measurement is equal to the change in $\phi$ caused by a change in the ratio $E_{sc}/E_c$, between initial and final settings. This magnitude may be determined from Table I. For example, if the subcarrier is known to be at least 40 db below the carrier at both the initial and final settings, the phase of the subcarrier will vary between 89.43 and 90.00 degrees from being 180° out of phase with the carrier. Thus the change in phase shift of the component, disregarding any other sources of error, differs from the standard's change in phase shift by not more than 0.57°. In the case of low loss and standard phase shifters, a conservative estimate of the amplitude variation of the output wave is $\pm 0.5$ db for each, and $E_{sc}/E_c$ could change by 2 db. If the relative level of the subcarrier to the carrier is adjusted to be 55 db initially, the limit of error would be approximately one-fifth of 89.94–89.82 degrees, or 0.024 degree.

Obviously many modifications and variations of the present invention are possible in the light of the above teachings. For example, the order of the components in the carrier channel and the order of the components in the subcarrier channel is not restricted to that shown in the various figures but may be interchanged within their own channel without affecting the basic operation of the invention. Again, an amplifier may be substituted for either modulator 16, 23, 48, or 76, and the gain of the amplifier modulated to produce the sidebands. It is therefore to be understood, that within the scope of the appendent claims, the invention may be practiced otherwise than as specifically described.

What is claimed is:

1. In a system for measuring the attenuation and/or phase of a test component, a first signal source providing a continuous wave carrier defined by $A \cos \omega_c t$, where $A_c$ represents the amplitude and $\omega_c$ the angular frequency of said carrier, a first channel including a variable phase shifter, means for applying said carrier to the input of said first channel, whereby the output of said first channel comprises a signal defined by $E_c \cos(\omega_c t + \Phi)$, where $E_c$ is the amplitude of the carrier after passing through said channel and $\Phi$ represents the shift in the phase of said carrier effected by said phase shifter, a second channel including amplitude modulating means connected in series with said test component and responsive to said carrier for providing an output signal defined by $E_{sc}(1+m \cos \omega_m t) \cos \omega_c t$, where $E_{sc}$ is substantially equal to the amplitude of the carrier when it is applied to said modulating means, $m$ represents the modulation factor and $\omega_m$ the angular frequency of the amplitude modulation, means for applying said carrier to said second channel, an amplitude detector connected to the output of said first and second channels, and indicating means for providing an indication of the level of the output of said amplitude detector.

2. The system set forth in claim 1 wherein said indicating means comprises:

a level monitor connected to the output of said amplitude detector, a level indicator, and an attenuator connected between the output of said amplitude detector and the input to said level detector.

3. The system set forth in claim 1 including:

means for adjusting the amplitude of the output of said first channel and wherein said indicating means comprises:

a level monitor connected to the output of said amplitude detector, a level indicator, and an attenuator connected between the output of said amplitude detector and the input to said level detector.

4. The system set forth in claim 1 wherein said indicating means comprises:

an amplitude modulation detector tuned to said modulation frequency.

5. The system set forth in claim 1 including:

means for adjusting the amplitude of the signal appearing in the output of said first channel, means for adjusting the amplitude of the signal appearing in the output of said second channel, and wherein said indicating means comprises:

an amplitude detector tuned to said modulation frequency.

6. The system set forth in claim 1 wherein:

said indicating means comprises a null detector, and including a third channel comprising a second signal source and a standard attenuator connected in series, said second signal source providing a signal that is a function of $\cos \omega_m t$, means for applying the output of said second signal source to said amplitude modulating means, and means for applying the outputs of said standard attenuator and amplitude detector to said null detector.

7. The system set forth in claim 6 wherein:

said third channel includes a phase adjuster and an amplitude adjuster connected in series with said second signal source and said standard attenuator.

8. The system set forth in claim 7 wherein:

said first channel includes a level setter connected in series with said phase shifter, and a level monitor connected to the output of said amplitude detector.

References Cited by the Examiner

UNITED STATES PATENTS

| | | | |
|---|---|---|---|
| 2,596,288 | 5/1952 | Robertson | 324—58 |
| 2,813,250 | 11/1957 | Tyson | 324—84 X |
| 2,939,076 | 5/1960 | Dropkin | 324—84 X |
| 2,983,866 | 5/1961 | Alford | 324—58 |
| 3,034,045 | 5/1962 | Weinschel | 324—58 |

WALTER L. CARLSON, *Primary Examiner.*

A. E. RICHMOND, *Assistant Examiner.*